United States Patent [19]

Gonzalez

[11] Patent Number: 4,937,064
[45] Date of Patent: Jun. 26, 1990

[54] PROCESS OF USING AN IMPROVED FLUE IN A TITANIUM DIOXIDE PROCESS

[75] Inventor: Raul A. Gonzalez, Newark, Del.

[73] Assignee: E. I. Du Pont de Nemours and Company, Wilmington, Del.

[21] Appl. No.: 250,876

[22] Filed: Sep. 29, 1988

Related U.S. Application Data

[63] Continuation-in-part of Ser. No. 118,672, Nov. 9, 1987, abandoned.

[51] Int. Cl.5 .............................................. C01G 23/07
[52] U.S. Cl. ..................................... 423/613; 501/134; 138/38; 138/39; 165/179
[58] Field of Search ......................... 423/613; 501/134; 138/38, 39; 165/179

[56]  References Cited

U.S. PATENT DOCUMENTS

| | | | |
|---|---|---|---|
| 2,488,439 | 11/1949 | Schaumann | 423/613 |
| 2,488,440 | 11/1949 | Schaumann | 423/613 |
| 2,559,638 | 7/1951 | Krchma et al. | 106/300 |
| 2,833,627 | 5/1958 | Krchma | 165/154 |
| 3,208,866 | 9/1965 | Lewis et al. | 106/300 |
| 3,273,599 | 9/1966 | Heeren | 138/38 |
| 3,505,091 | 4/1970 | Santos | 106/300 |
| 3,867,515 | 2/1975 | Bohl et al. | 423/613 |
| 4,145,403 | 3/1979 | Fey et al. | 423/613 |
| 4,170,630 | 10/1979 | Hoelscher | 423/613 |
| 4,389,391 | 6/1983 | Dunn, Jr. | 423/613 |
| 4,455,288 | 6/1984 | Salter et al. | 423/613 |
| 4,462,979 | 7/1984 | Stevens et al. | 423/613 |
| 4,578,090 | 3/1986 | Rado | 423/613 |

OTHER PUBLICATIONS

Huntington Alloys Nickel, International Nickel Company, Inc., 2nd Ed., 1972, pp. 1,2,14 and 15.

Primary Examiner—Robert L. Stoll
Assistant Examiner—Paige C. Harvey

[57]  ABSTRACT

In the process for producing titanium dioxide by
(a) reacting titanium tetrachloride and oxygen in the vapor phase to produce titanium dioxide, and
(b) subsequently cooling the titanium dioxide in a flue, an improvement comprising utilizing for all or a portion of the flue a conduit having a plurality of internal, substantially longitudinal protuberances, depressions or both.

15 Claims, 1 Drawing Sheet

PROCESS OF USING AN IMPROVED FLUE IN A TITANIUM DIOXIDE PROCESS

CROSS REFERENCE TO RELATED APPLICATION

This application is a continuation-in-part of prior pending application Ser. No. 07/118,672, filed Nov. 9, 1987 now abandoned.

BACKGROUND OF THE INVENTION

Substantial quantities of titanium dioxide pigment are produced commercially by reacting titanium tetrachloride with oxygen in the vapor phase. Immediately after such reaction, the titanium dioxide reaction mass is cooled by passing it through a conduit, i.e., flue, where growth of the titanium dioxide pigment particles takes place and agglomeration of such particles takes place.

It is desirable to cool the titanium dioxide rapidly because this will result in pigment having higher carbon black undertone ("CBU"). CBU is described in U.S. Pat. No. 2,488,440, which is hereby incorporated by reference. However, when a smaller diameter flue is used to permit more rapid cooling, it has been found that while CBU is increased, turbulence can be increased, which increases agglomeration of the pigment particles and thereby decreases pigment gloss.

Also, it would be desirable to operate titanium dioxide processes at higher pressures to minimize equipment expenditures, but this can decrease CBU. Moreover, it is desirable to increase $TiO_2$ output, but higher product output can decrease CBU (due to the increased pressure) and decrease gloss (due to the increased turbulence).

The following information is disclosed which may be of interest to this invention.

U.S. Pat. No. 3,273,599 discloses an internally finned condenser tube.

U.S. Pat. No. 2,833,627 discloses a method for cooling $TiO_2$ by passing it through a water-cooled conduit.

U.S. Pat. No. 4,462,979 discloses a method for cooling and producing $TiO_2$ having improved agglomerating properties, which comprises first increasing the cross-sectional area of the flue and then decreasing the cross-sectional area of the flue.

SUMMARY OF THE INVENTION

In a process for producing titanium dioxide by
(a) reacting titanium tetrachloride and oxygen in the vapor phase to produce titanium dioxide, and
(b) subsequently cooling the titanium dioxide in a flue,
the improvement comprising utilizing for all or a portion of the flue a conduit having a plurality of substantially longitudinal protuberances, depressions or both.

It has been found that at a given production rate the process of this invention can improve gloss and CBU or either of such properties. Also, use of the process of this invention can permit operation at higher pressures (which can permit decreased equipment expenditures and increased titanium dioxide pigment output) while still maintaining satisfactory pigment gloss and CBU.

DETAILED DESCRIPTION OF THE INVENTION

Figure 1:
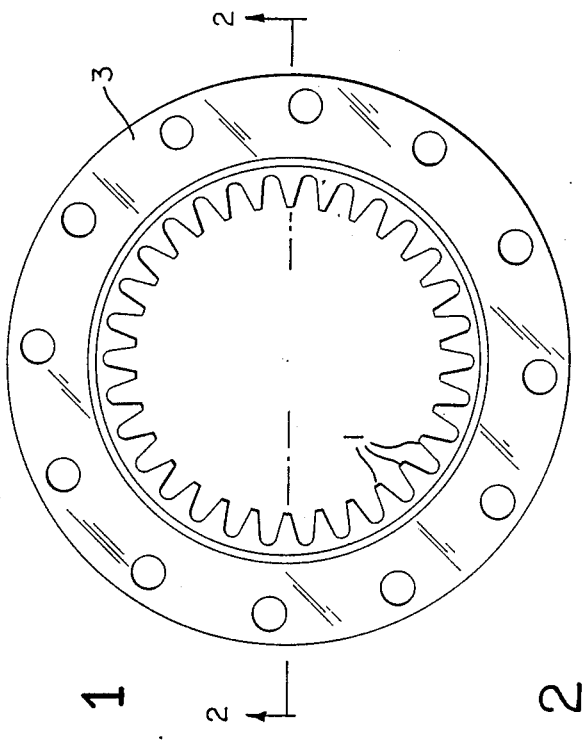
FIG. 1 illustrates an end view of the conduit (pipe) utilized in the invention.

The process for producing titanium dioxide pigment by reacting oxygen and titanium tetrachloride in the vapor phase is disclosed, for example, in U.S. Pat. Nos. 2,488,439, 2,488,440, 2,559,638, 2,833,627, 3,208,866, and 3,505,091. The disclosures of such patents are hereby incorporated by reference.

Such reaction usually takes place in a pipe or conduit, wherein oxygen and titanium tetrachloride are introduced at a suitable temperature and pressure for production of the titanium dioxide. In such reaction, a flame generally is produced.

Downstream from the flame, the titanium dioxide produced is fed through an additional length of conduit wherein cooling takes place. For the purposes herein, such conduit will be referred to as the flue. The flue should be as long as necessary to accomplish the desired cooling. Typically, the flue is water cooled and can be about 50-3000, preferably about 100-1500, and most preferably about 200-1200 feet long.

The improved flue used in this invention can be any suitable shape which does not cause excessive turbulence. Preferably, the flue will be round, i.e., in the form of a pipe.

The improved flue used in this invention has substantially longitudinal internal protuberances, depressions or both. Examples of suitable protuberances include ridges and/or fins. Examples of depressions include grooves and/or cuts. Examples of both protuberances and depressions include a conduit having similar shaped protuberances and depressions such as a pipe having a corrugated surface. Preferred is a flue with protuberances; especially preferred is a flue with internal fins. Another preferred embodiment is a flue with internal, hollow fins.

Because the improved flue used in this invention can be more expensive than an ordinary flue, typically, only a portion of the flue will have protuberances, depressions or both. Also, because most of the cooling of the $TiO_2$ will take place in close proximity to the flame of the titanium dioxide reaction, preferably, the improved flue used in this invention will be used substantially immediately downstream of the reaction flame, and continue thereafter until the point is reached where substantially all or most of the growth and/or agglomeration of the pigment particles ceases. Typically, the length of the improved flue used in this invention will be about 5-500, more preferably about 5-300, and most preferably about 5-100 feet. If desired, however, all or most of the flue can be the improved flue used in this invention; and, if so, this can decrease the required length because of the more efficient cooling it provides.

The following additional considerations should be taken into account in designing the improved flue used in this invention:

To enhance cooling, there generally should be as many protuberances and/or depressions as possible, provided, however, that (1) there are not too many which would cause close spacing and consequently adherence between them of pigment or the particles of any material which are injected to scour the flue, and (2) the protuberances are not so thin that they substantially erode or corrode. Preferably, the spacings between the protuberances and/or depressions will be equal.

Generally, the protuberances and/or depressions should be substantially longitudinal, i.e., located along the length of the flue. By the term "substantially longitudinal" is meant that the protuberances and/or depressions should be substantially parallel (i.e., parallel to the axis of the conduit) or somewhat angled, (i.e., similar to the grooves in a rifle barrel). Preferably, the protuberances and/or depressions will be substantially parallel.

In regard to the height of the protuberances, they preferably should be as high as possible to enhance cooling, but not so high that they seriously erode (due to a high tip temperature) or cause increased turbulence.

The composition of the improved flue used in this invention should be any material which is chlorine resistant and has good heat transfer properties; preferred is nickel or a nickel alloy such as alloys commercially available as Nickel 200 or Nickel 201. Nickel 200 is commercially pure wrought nickel having a minimum of 99% nickel. Nickel 201 is the low carbon version of Nickel 200.

Preferably, the tips of the protuberances should be thinner than the base of the protuberances; preferred are protuberances of a trapezoidal shape where the spaces between the protuberances are depressions which are rounded.

Preferably, the protuberances are tapered, i.e., the inlet and outlet portions of the flue will have a protuberance height less than that at the highest point of the protuberances; especially preferred are protuberances which are tapered and flush with the interior of the flue at its inlet and outlet.

The interior diameter of the improved flue of this invention should be that which does not in itself cause substantial turbulence with the velocity and other conditions for the $TiO_2$ and other materials in the flue. Typical interior diameters are about 2-50 inches, preferably about 5-30 inches, and most preferably about 6-20 inches. Preferably, the improved flue of this invention will have a conduit interior diameter which is greater than that of the ordinary flue which is located upstream from the improved flue of this invention. In the foregoing and as elsewhere used herein, (a) "interior diameter" means the distance between the two lowest points in the flue which are opposite each other, and (b) "upstream" or "downstream" are in reference to the flow of titanium dioxide pigment through the flue. Preferably, the diameter of the improved flue of this invention, when measured from tip to tip of protuberances which are opposite each other, will be greater than or approximately equal to the diameter of the ordinary flue which is located upstream from the improved flue of this invention.

If it is desired to optimize the gloss properties of the $TiO_2$ pigment, the protuberances and/or depressions should be designed to reduce turbulence without reducing the cooling rate. Conversely, if it is desired to optimize the CBU of the $TiO_2$ pigment, the cooling rate should be improved without increasing turbulence.

Preferably, the interior diameter of the ordinary flue which is located downstream from the improved flue of this invention will be greater than that of the improved flue of this invention.

The following example illustrates this invention:

EXAMPLE

A 32-foot section of conduit pipe, comprised of Nickel 200, was inserted approximately 12 feet from the flame base which oxidizes $TiCl_4$ to $TiO_2$ in a continuous $TiO_2$ reactor. The conduit had an interior diameter of 11.5 inches and had 30 trapezoidal-shaped protuberances which were approximately 1 inch high. The base of the protuberances were 0.77 inch across, and the tips of the protuberances were 0.19 inch across. The spaces between the protuberances were depressed and rounded. The protuberances were tapered so that at the inlet and outlet of the conduit they were flush with the interior surface of the conduit. An ordinary flue with a smooth interior surface was attached to the downstream end of the conduit and had an interior diameter of 11.5 inches which tapered to 12.25 inches interior diameter.

Figure 2:
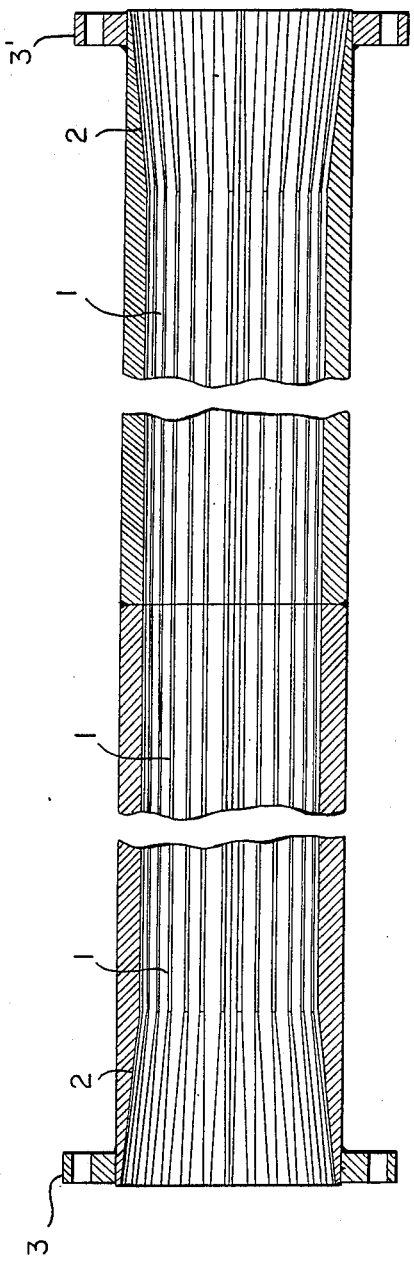
FIG. 2 illustrates a side view of the conduit (pipe) taken on line 2—2 of FIG. 1.

The 32-foot section of conduit pipe was comprised of two identical 16-foot sections of conduit which were bolted together. One of the 16-foot sections is illustrated in FIGS. 1 and 2. FIG. 1 is an end view of such 16-foot section of conduit and FIG. 2 is a section taken on line 2—2 of FIG. 1. In the drawings, item 1 shows the trapezoidal-shaped protuberances, item 2 shows the taper of the protuberances, and item 3 shows the flanges which are used to bolt the conduits together.

The rate of $TiO_2$ production was about 18 tons per hour, the pressure was about 47 psig, the $TiCl_4$ temperature was about 420° C., the $O_2$ temperature was about 1530° C., excess oxygen was about 7%, chlorine purge was about 3000 pounds per hour, and sodium chloride scrub of about 6 pounds per 100 pounds of $TiO_2$ was used to prevent $TiO_2$ buildup on the interior surface of the flue.

For the $TiO_2$ produced, the CBU was about 10 and the 30-J gloss was about 76. The 30-J gloss is a standard test which is performed by making an alkyd resin paint having about 16 percent $TiO_2$ pigment volume concentration (i.e., the volume of pigment occupied by the total volume of the dried paint film). The paint was sprayed on a smooth aluminum substrate, dried, and the gloss measured at a 20° angle by a gloss meter such as the Hunter Lab D-48 Glossmeter.

The invention claimed is:
1. In the process for producing titanium dioxide by
   (a) reacting titanium tetrachloride and oxygen in the vapor phase to produce titanium dioxide, and
   (b) subsequently cooling the titanium dioxide by passing it through a flue, the improvement comprising utilizing for all or a portion of the flue a pipe having a plurality of protuberances, depressions or both which extend longitudinally along the interior surface of said pipe, said pipe having an inlet and outlet for the passage of titanium dioxide.
2. The process of claim 1 wherein the flue is cooled on its exterior surface by water.
3. The process of claim 1 wherein the protuberances have tips and bases, and wherein the tips of the protuberances are thinner than the bases of the protuberances.
4. The process of claim 3 wherein the protuberances are trapezoidal in shape, there are spaces between the protuberances, and the spaces between such protuberances are rounded depressions.
5. The process of claim 1 wherein the interior diameter of the pipe, as measured between the two lowest points of the pipe which are opposite each other, is about 2-50 inches.

6. The process of claim 1 wherein one or more protuberances at the inlet and outlet portion of the pipe are tapered so that said protuberances are flush with the interior of the pipe as its inlet and outlet.

7. The process of claim 1 wherein (a) a portion of the flue is said pipe, and (b) the interior diameter of the pipe, as measured between the two lowest portions of the pipe which are opposite each other, is greater than the portion of the flue which is not said pipe and is located upstream from the pipe.

8. The process of claim 7 wherein the interior diameter of the pipe is greater than or approximately equal to the portion of the flue which is not said pipe and is located upstream from the pipe.

9. The process of claim 1 wherein (a) the protuberances have tips and bases, (b) the tips of the protuberances are thinner than the bases of the protuberances, and (c) one or more protuberances at the inlet and outlet portion of the pipe are tapered so that said protuberances are flush with the interior of the pipe at its inlet and outlet.

10. The process of claim 9 wherein (a) a portion of the flue is said pipe, and (b) the interior diameter of the pipe, as measured between the two lowest portions of the pipe which are opposite each other, is greater than the portion of the flue which is not said pipe and is located upstream from the pipe.

11. The process of claim 9 where the diameter of the pipe, when measured from tip to tip of protuberances which are opposite each other, is greater than or approximately equal to the interior diameter of the flue which is not the pipe and is located upstream from the pipe.

12. The process of any one of claims 1-11 wherein the pipe having protuberances, depressions or both comprises nickel or a nickel alloy.

13. The process of any one of claims 1-11 wherein the protuberances are fins.

14. The process of any one of claims 1-11 wherein the protuberances are hollow fins.

15. The process of any one of claims 1-11 wherein (a) a portion of the flue is said pipe, and (b) the portion of the flue which is not the pipe and is located downstream from the pipe has an interior diameter greater than or equal to said pipe.

* * * * *